United States Patent Office 3,166,962
Patented Jan. 26, 1965

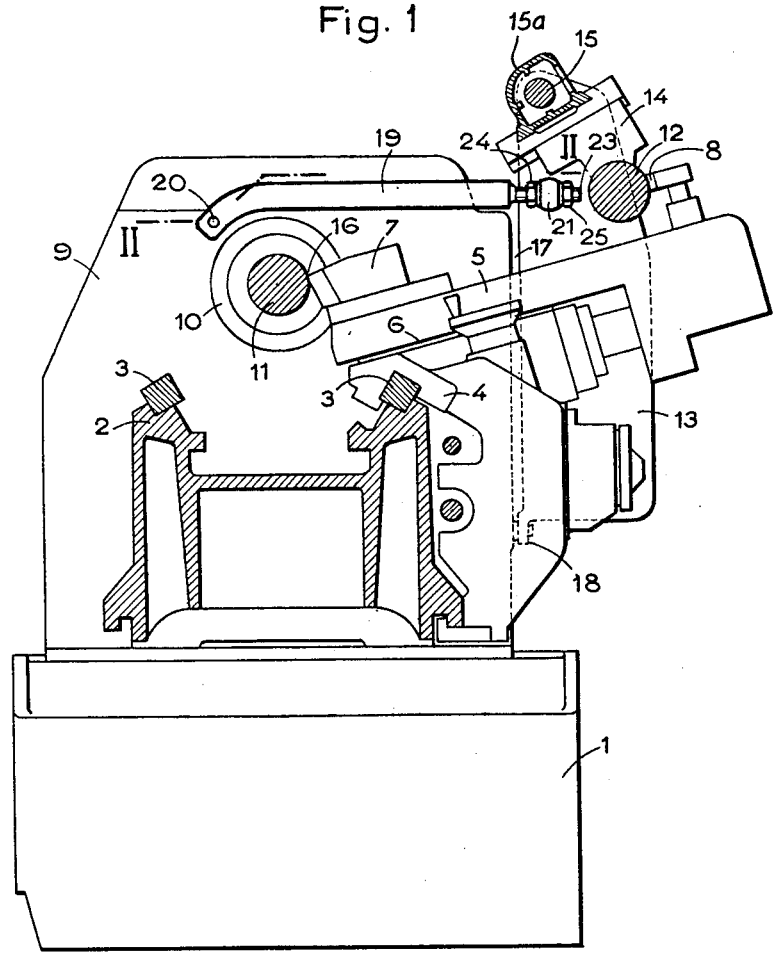
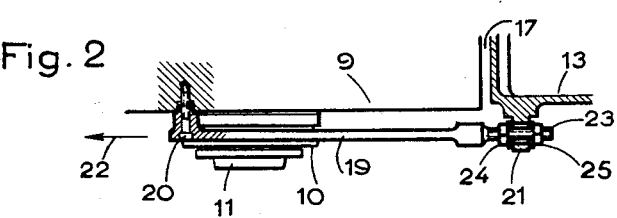

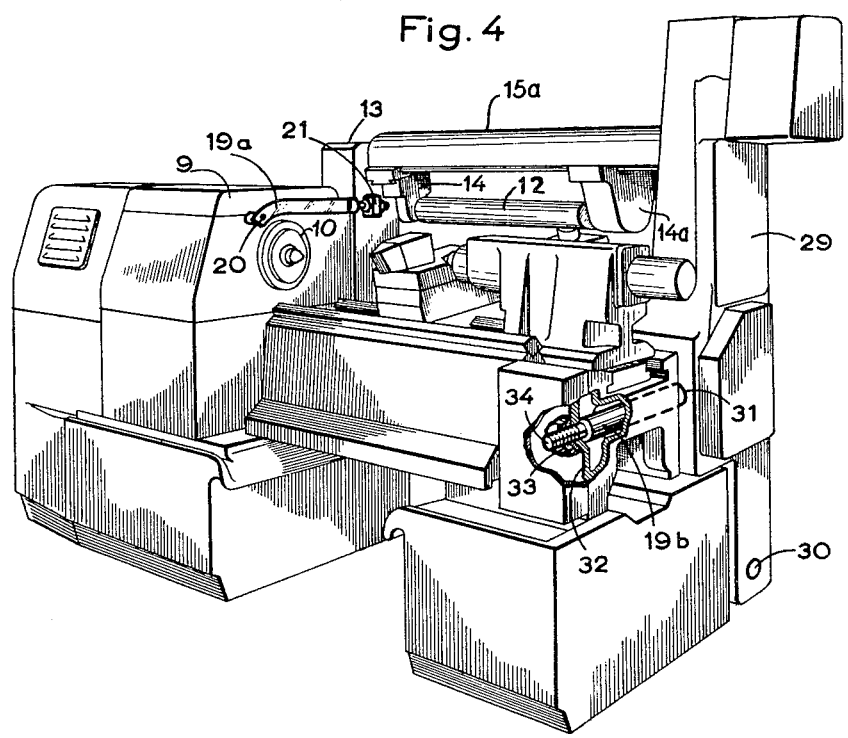

3,166,962
COPYING MACHINE TOOLS
Armand Marcel Le Lan, Vanves, France, assignor to
H. Ernault-Batignolles, Paris, France, a company of
France
Filed May 6, 1960, Ser. No. 27,417
Claims priority, application France May 11, 1959
5 Claims. (Cl. 82—14)

The invention relates to copying lathes and the like machine tools of the type comprising in addition to a base, a headstock and a tailstock, means for centering a workpiece in the headstock and the tailstock, means in the headstock for rotating the workpiece, a cross-slide carrying a cutting tool, means for supporting a template or pattern with its axis generally parallel to the lathe axis, and a pattern follower mounted on the cross-slide.

In such a machine tool, the displacements of the tool must faithfully reproduce those of the follower.

The machine tool heats up in the course of operation, and the resultant distortions destroy the precision of the copying operation. The distance between the pattern and the spindle, which is established at the time of adjustment of the machine, will have changed slightly at the end of a period of operation, when the machine has reached a steady working temperature.

The thermal effects can further be applied in an irregular way at particular locations to place the machine out of adjustment. Such effects may cause a decrease or an increase of diameter of the workpiece being machined dependent upon how the overall expansion effects of the heat on the different parts affect the position of the pattern and consequently of the tool relative to the axis of the workpiece.

To maintain an established distance between the pattern and the workpiece and to avoid variation of this distance due to deformation of the ground or of the machine, as well as vibration and other mechanical effects, it is particularly advantageous to mount one end of the pattern on a support rigid with the base at a point facing the tailstock, and its other end on a support rigid with the headstock.

Unfortunately, if the supports of the ends of the pattern are rigidly fixed to the base and to the heatstock respectively, these supports tend to be displaced under the effect of heat by distortion on the one hand of the headstock casing and on the other of the base, as well as by their own distortions due to the heat transmitted to them by conduction from the headstock and from the base as a result of their being in contact with the latter.

Moreover and above all, the displacements of the two ends of the pattern resulting from the distortions in question are random and never rigorously identical because the heating of the base in the vicinity of the tailstock is always much less than the heating of the headstock, and because the form and nature of the attachments of the supports of these two ends of the pattern are not identical. It may further be noted that movements of the support of the end adjacent the tailstock are in many cases negligible.

From the foregoing it results that the distance between the axes of the pattern and of the workpiece near the headstock end tends to increase appreciably after a certain period of working, while the distance between the same axes at the tailstock end remains constant or only increases to an insignificant extent during the same period.

The two conditions, which seem, at first analysis, to be satisfied, therefore appear to be contradictory: it seems impossible to make an attachment to the machine such that the pattern support is rigidly connected thereto while at the same time to avoid misadjustment due to distortions caused by a rise of temperature.

It is the object of invention to provide a machine tool in which means is provided for remedying the above defined defects by constantly compensating misadjustment due to thermal distortion in such a way as to maintain the axis of the pattern exactly parallel to the axis of the workpiece.

To this end, according to a further object of the invention, the pattern is supported, at the headstock end, by a support mounted on the headstock casing, but as thermally independent as possible from this casing, such support can be displaced relative to the headstock casing by connecting means such as a link fixed at one point of the support and at one point of the headstock casing, these points being selected such that the distance between the axis of the pattern and that of the centers at their ends adjacent the headstock is constantly maintained equal to the distance separating the said axes at their other ends, that is those near the tailstock.

In a form of construction adapted to machines whose base is subjected to relatively little thermal effect in the vicinity of the tailstock, the end of the pattern adjacent the tailstock is mounted on a support fixed to the base in a rigid manner.

By a suitable choice of the points of fixation of the above mentioned connecting means, having regard to their shape, dimensions and material to the thermal effects to which they can be subject and to the freedom of movement of the pattern support mounted on the headstock, it is possible to ensure that the separation between the axes of the pattern and workpiece as to the end of the pattern next the headstock is maintained constant.

In these conditions, if the rigid support at the tailstock end is not subject to any appreciable displacement due to thermal effects, parallelism of the axes of the pattern and workpiece will automatically be ensured. If, on the contrary, the support at the tailstock end is subject to non-neglible displacement due to thermal effects, maintenance of constant separation between the axes of the workpiece and pattern at the headstock end of the latter would result in a loss of parallism between these axes.

In another form of construction of the invention, adapted to the case where thermal effects, at the tailstock end, are not negligible, the support of the tailstock end of the pattern is itself made as thermally independent of the base as possible, while remaining supported on the latter, and this support, like that of the headstock end of the pattern, is displaceable relative to the base by connecting means, such as a link, fixed at one point of the support and at one point of the base.

In this form of construction, as in the preceding one, the fixation points of the connecting means are so chosen as to maintain an exact parallel relation between the axis of the pattern and that of the workpiece.

The invention will be described with respect to the following detailed description having reference to the accompanying drawings, which illustrate three embodiments of the invention, shown by way of example only and without implied limitation of the scope of the invention.

In the drawings:

FIGURE 1 is an elevation view, partly section, of a copying lathe according to the invention, taken in a plane perpendicular to the spindle axis;

FIGURE 2 is a section along the chain-dotted line II—II of FIGURE 1;

FIGURE 4 is a perspective view of a copying lathe according to still another embodiment of the invention.

Figure 3:
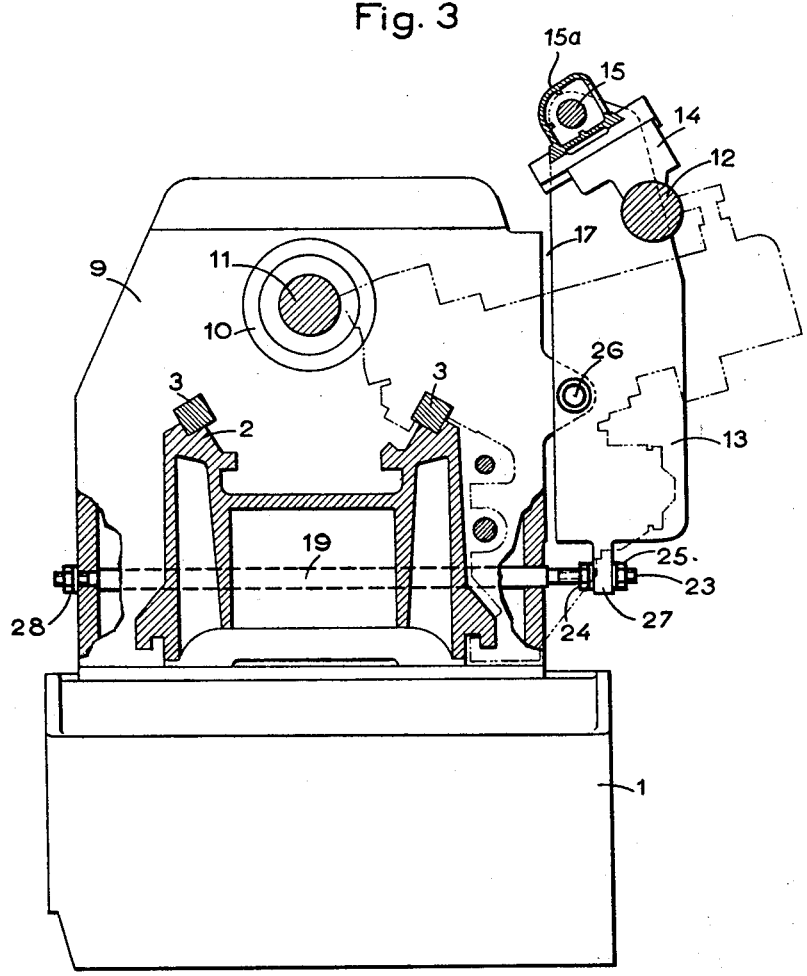
FIGURE 3 is a view, similar to that of FIGURE 1, of a machine tool according to another embodiment of the invention.

The machine tool illustrated in FIGURE 1 comprises a base 1 carrying a bed 2 provided with slides 3.

A longitudinal carriage 4 is displaceable on the slides 3 and supports a cross-slide 5 by means of slides 6.

The cross-slide 5 carries a tool 7 and a follower 8.

The lathe also comprises a headstock 9 whose spindle is rigid with a chuck 10 in which the workpiece 11 is fixed.

In the form of construction illustrated in the drawing, the pattern 12 is carried by arms 14, 14a projecting radially from a sleeve member 15a rotatably mounted on a horizontal shaft 15 supported at one end by a vertical structural element 13 attached to the headstock and at the other end by a second vertical structural element 29 (FIG. 4) attached to the tailstock, the shaft being supported by the two structural elements 13 and 29 so as to extend in parallelism with the axis of the workpiece. The pattern 12 is thus rockably mounted about the shaft 15, to allow its position to be adjusted, but once this adjustment is made, the pattern 12 is rigidly secured with respect to the two supports.

The invention allows absolute parallelism to be maintained between the pattern axis and the axis of the workpiece, at every instant during the machining operation whatever may be the temperature of the lathe.

To this end, the support 13 is as far as possible thermally insulated from the headstock 9. In FIGURE 1 the thermal insulation is obtained by the provision of a space 17 between the headstock 9 and the support 13. Air can thus freely enter between the headstock 9 and the support 13. The support 13 is secured to the headstock only by lugs 18 provided at the bottom of the support 13.

This mounting of the support 13 allows the pattern 12 to undergo slight displacement since the upper part of the support 13 is capable of movement away from or towards the headstock 9 as a result of slight elasticity of the lugs 18. These slight displacements of the support 13 take place relative to the adjacent region of the headstock casing wall and, notably, allow distortions of this wall to be compensated by displacements of the support in the sense opposite to that of these distortions.

To control the position of the end of the pattern adjacent the headstock relative to the corresponding end of the workpiece, a link 19 is provided, which is fixed at a point 20 to the headstock and at a point 21 to the support 13, point 20 being near the spindle axis.

The link 19 ensures a pre-determined relative support 13, point 20 being near hte spindle axis with respect to that of the workpiece 11, for any particular temperature of the lathe. The support 13 is therefore held at every instant in a perfectly defined position by the lugs 18 and the link 19.

The link 19 can thus be used to compensate, thermal expansions, and to maintain the alignment of the pattern axis parallel to the axis of the centers, whatever the temperature of the lathe may be.

It is in fact easy so to determine the fixation points of the link 19 on the headstock 9 and the support 13, having regard to the different thermal expansions and particularly those of the link 19 of the headstock 9 and of the support at the tailstock end, in order that parallelism is maintained between the pattern axis and the axis of the workpiece 11.

In the embodiment illustrated in FIGURES 1 and 2, the fixation point 20 of the link 19 and the fixation point 18 of the support 13 on the headstock 9 are on opposite sides of the workpiece 11, i.e. of the spindle axis. In the course of heating of the headstock the point 20 is displaced in the direction of the arrow 22 (FIGURE 2). It therefore tends to bring the pattern 12 nearer to the workpiece 11. This movement compensates the movement which would be obtained due to other expansion movements such as primarily lengthening of the link 19, or secondarily to outwardly displacement of the headstock casing wall on which the lugs 18 are fixed.

It is to be understood that the position of the point 20 must depend on the lay-out of the machine tool and its constituent elements. In some cases, the point 20 could be on the same side as the support 13 with respect to the spindle, or even situated exactly below the spindle.

A supplementary advantage of the use of a link such as 19 connecting the support 13 to the headstock 9 is the possibility of adjusting parallelism between the pattern 12 and the spindle, concurrently with the general adjustment of the machine. To this end the connection between the link 19 and the support 13 can be effected as illustrated in FIGURE 2. The link 19 has a threaded portion 23 in engagement with nuts 24 and 25 abutting against a lug 21 which is integral with the support 13.

Adjustment of the nuts 24 and 25 allows the distance between lug 21 and the point 20 to be increased or decreased, that is to say, allows the parallelism between the pattern and the spindle to be adjusted for a given temperature.

Once this parallelism is adjusted, the link 19 acts to maintain it, as described above.

The invention can likewise be carried out by disposing the link 19 elsewhere than at the upper part of the headstock.

FIGURE 3 shows a modification in which the link 19 is of a different form.

In this modification the support 13 instead of being secured to the headstock 9 by means of lugs 18 is rockably mounted on a horizontal axle 26. It is therefore mounted on the headstock but is substantially thermally insulated therefrom by the air present in the space 17.

At its bottom the support 13 carries a lug 27 to which is fixed one end of the link 19 in the same way as that illustrated in FIGURE 2, which, as before, allows adjustment of parallelism between the pattern and the spindle.

In the case of FIGURE 3, the link 19 passes through the headstock 9 and is fixed thereto at a point 28 on the side opposite to the lug 27 with reference to the vertical plane passing through the lathe spindle. The link 19 is then directly subject to the heat of the headstock, and moreover receives the hot oil which drips from the gearing inside the headstock casing. The link 19 therefore heats-up and can be so dimensioned and made of such a metal that its expansion continuously corrects the errors of adjustment which would arise from thermal expansions of the other elements. In particular, lengthening of the link 19 counteracts the movement of its end which is anchored on the headstock due to the expansion of the latter and compensates for the displacement of the pivot 26 with the headstock by pivotal movement of support 13 about pivot 26.

FIGURE 4 illustrates a further embodiment in which two links are provided. One of the links, 19a, connects the headstock 9 to the support 13, in the same manner as shown in the embodiment illustrated in FIGURE 1; and the mounting of the support 13 on the headstock is as has already been described with reference to FIGURE 1.

The other link 19b connects a part of the base situated beneath the tailstock to the second support 29 of the pattern 12. This support 29 is articulated on a horizontal axle 30 rigid with the lower part of the lathe base and parallel to the axis of the workpiece. The link 19b is rigidly attached to the support 29 at a point 31 and is fixed to a wall 32 of the base by means of nuts 33 engaging a screw-threaded part 34 constituting the end of the link 19b and passing through the wall 32.

The expansions of the links 19a and 19b, having regard to the positions of their attachment points, continuously correct the errors of adjustment which arise from thermal expansions of the other elements.

It is to be understood that the invention is in no way limited to the examples described and illustrated; it is capable of numerous modifications, within the competence of a man skilled in the art without departing from the spirit of the invention.

Thus, the pattern support can be mounted on the base by means other than those which have been described and illustrated, for instance by means of rolling elements. Furthermore, the link or links connecting the support to the base can be replaced by other connecting means appropriate for ensuring maintenance of the conditions of parallelism defined above.

Having thus described the invention, what is claimed as new and desired to be secured by Letters Patent is:

1. In a copying lathe having a headstock and a tailstock means for centering a workpiece in the headstock and the tailstock, a horizontal shaft, means for supporting said shaft parallel to the said workpiece, a rotatable sleeve member on said shaft, a pair of parallel arms projecting from said sleeve member and adapted to support a pattern therebetween for pendulous swinging motion about said shaft, said means for supporting said shaft including a vertical structural element having a substantial portion which is thermally insulated from said headstock, means attaching said element to said headstock for restricted displacement relative thereto, and connecting means connecting said thermally insulated portion of the element to said headstock and adapted to move said portion about the attaching means upon thermal expansion of said headstock so as to maintain the parallel relation between the shaft and the workpiece.

2. A machine tool as defined in claim 1, in which said structural element is pivotally mounted, at the midpoint of its height, on said headstock and extends in spaced relation with respect thereto and said connecting means is constituted by a generally horizontal, rigid link passing through the headstock and located at a point of said element near its lower end and at a point on the wall of the headstock which is remote from said element.

3. A machine tool as defined in claim 1, in which said structural element is rigidly secured to the headstock at its lower end and extends therefrom in spaced relation to enable the free circulation of air therebetween.

4. A machine tool as defined in claim 3 in which said connecting means is constituted by a rigid link, said connecting means being coupled to said structural element near the upper end thereof and being coupled to the headstock adjacent the axis of workpiece.

5. A machine tool as defined in claim 4, in which said connecting means is coupled to the headstock on a side of the axis of said workpiece which is opposite to the rigid attachment of the lower end of said structure element to the headstock.

References Cited in the file of this patent
UNITED STATES PATENTS

| | | |
|---|---|---|
| 2,376,100 | Turrettini | May 15, 1945 |
| 2,664,787 | Plimmer | Jan. 5, 1954 |
| 2,956,344 | Rantsch | Oct. 18, 1960 |
| 2,957,392 | Zwick et al. | Oct. 25, 1960 |
| 2,966,084 | Le Brusque | Dec. 27, 1960 |